United States Patent
Young

(10) Patent No.: US 6,535,936 B2
(45) Date of Patent: *Mar. 18, 2003

(54) SCSI PHASE STATUS REGISTER FOR USE IN REDUCING INSTRUCTIONS EXECUTED BY AN ON-CHIP SEQUENCER IN ASSERTING A SCSI ACKNOWLEDGE SIGNAL AND METHOD

(75) Inventor: B. Arlen Young, Palo Alto, CA (US)

(73) Assignee: Adaptec, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/343,324

(22) Filed: Jun. 30, 1999

(65) Prior Publication Data

US 2003/0014580 A1 Jan. 16, 2003

(51) Int. Cl.[7] .............................................. G06F 13/20
(52) U.S. Cl. .............................. 710/62; 710/36; 710/59; 710/72; 710/313
(58) Field of Search ............................... 710/5, 36, 48, 710/55, 59, 62, 72, 305, 313

(56) References Cited

U.S. PATENT DOCUMENTS

| | | | |
|---|---|---|---|
| 5,625,800 A | * 4/1997 | Brayton et al. | 703/23 |
| 5,797,034 A | * 8/1998 | Young | 710/21 |
| 5,812,875 A | * 9/1998 | Eneboe | 710/1 |
| 6,157,971 A | * 12/2000 | Gates | 710/1 |
| 6,202,117 B1 | * 3/2001 | Gates | 710/114 |
| 6,253,272 B1 | * 6/2001 | Young | 710/310 |
| 6,298,403 B1 | * 10/2001 | Suri et al. | 710/100 |

* cited by examiner

*Primary Examiner*—Jeffrey Gaffin
*Assistant Examiner*—Harold Kim
(74) *Attorney, Agent, or Firm*—Gunnison, McKay & Hodgson, L.L.P.; Forrest Gunnison

(57) ABSTRACT

A SCSI bus phase status register is included in a parallel SCSI host adapter integrated circuit. Initially, the SCSI bus phase status register has a predefined value. When the parallel SCSI host adapter integrated circuit must wait for assertion of a request signal by a target device, e.g., an active request signal is expected by the host adapter integrated circuit, an on-chip sequencer executes a SCSI bus phase status register read instruction. When the SCSI bus phase status register is read and has the predefined value, an active pause signal is sent to the on-chip sequencer that causes the sequencer to suspend execution of the read instruction. When an active request signal is received from the target device, the SCSI bus phase status register is loaded automatically with a current SCSI bus phase a predefined period of time after the assertion of the request signal provided that an active parity error signal is not generated by the host adapter integrated circuit within the predefined period of time. The loading of the SCSI bus phase status register inactivates the pause signal and generates an active unpause signal. Upon receipt of the active unpause signal, the sequencer resumes execution of the SCSI bus phase status register read instruction and if the SCSI bus phase in the register matches and expected SCSI bus phase, the sequencer branches to a routine for the SCSI bus phase that in turn asserts an acknowledge signal.

14 Claims, 3 Drawing Sheets

SCSI PHASE STATUS REGISTER FOR USE IN REDUCING INSTRUCTIONS EXECUTED BY AN ON-CHIP SEQUENCER IN ASSERTING A SCSI ACKNOWLEDGE SIGNAL AND METHOD

BACKGROUND OF THE INVENTION

1. Field of the Invention

This invention relates generally to data transfers over a SCSI bus, and in particular to determining the SCSI bus phase status.

2. Description of Related Art

Prior single chip parallel SCSI host adapters have included a plurality of modules and an on-chip processor that controlled operation of the modules. For example, see U.S. Pat. No. 5,659,690, entitled "Programmably Configurable Host Adapter Integrated Circuit Including a RISC Processor," issued on Aug. 19, 1997 to Stuber et al., which is incorporated herein by reference.

A typical parallel SCSI host adapter integrated circuit 100 included a SCSI module 130 (FIG. 1), a sequencer 120, a data FIFO memory circuit 160, a memory 140, and a host interface module 110 that were interconnected by an internal chip I/O bus CIOBUS, which was used for control of host adapter integrated circuit 100 both by a host microprocessor 170 through a host adapter driver 165 and by sequencer 120. The combination of host adapter driver 165, sequencer 120, and SCSI module 130 were used for controlling both synchronous and asynchronous transfers over SCSI bus 150.

As is known to those of skill in the art, information transfer over SCSI bus 150 uses a handshake method that utilizes request signals REQs and acknowledge signals ACKs. Typically, sequencer 120 executes a sequence of instructions to perform an operation over SCSI bus 150, and then waits for an active request signal REQ from the target device.

When host adapter 100 receives an active request signal REQ, sequencer 120 must determine the phase of SCSI bus 150 and then branch to a firmware routine that handles the SCSI bus phase. The firmware routine that handles the SCSI bus phase causes SCSI module 130 to generate an active acknowledge signal ACK on SCSI bus 150 at some point in the execution of the routine.

It is desirable to generate an active acknowledge signal as soon as possible after the active request signal REQ is received. However, there is an inherent delay associated with sequencer 120 first determining the SCSI bus phase, branching to an appropriate firmware routine, and executing the firmware routine to reach the instruction that results in assertion of acknowledge signal ACK.

Actually, the problem is somewhat more complex. The storage space for sequencer firmware in host adapter 100 is limited. Also, there are many points in the SCSI bus protocol that require sequencer 120 to wait for an active request signal REQ before proceeding. To reduce the size of the sequencer firmware associated with waiting for an active request signal REQ, determining the SCSI bus phase, and branching accordingly, many of the common sequencer instructions were located in a subroutine that was called each time it was necessary to wait for an active request signal REQ.

Within this subroutine, a sequencer firmware instruction waited for assertion of request signal REQ. After request signal REQ was asserted, the next sequencer firmware instruction waited for a possible SCSI bus parity error to be cleared by host adapter 100. (The parity error wait instruction was necessary because there was a time delay between the occurrence of the parity error and when sequencer 120 was halted by that error. If sequencer 120 did not wait during this period, sequencer 120 could make an incorrect decision from a message byte with a bit error, and proceed down a wrong path before halting.)

After the parity error wait instruction, another sequencer firmware instruction configured a phase status byte based on the phase of the SCSI bus. After configuration of the phase status byte, the subroutine returned.

Upon return from the subroutine, subsequent sequencer firmware instructions compared an expected SCSI bus phase with the phase status byte and if a match was detected branched accordingly. Execution of the subroutine that waited for assertion of request signal REQ and the various comparisons necessary to determine the bus phase took an appreciable amount of time. However, the constraints imposed by the SCSI protocol and the storage space for sequencer firmware instructions necessitated this approach which delayed the assertion of acknowledge signal until the appropriate instruction was reached in the routine branched to based upon the comparisons.

SUMMARY OF THE INVENTION

According to the principles of this invention, a novel SCSI bus phase status register is included in a parallel SCSI host adapter integrated circuit. Initially, the SCSI bus phase status register has a predefined value. When the parallel SCSI host adapter integrated circuit must wait for assertion of a request signal by a target device, e.g., an active request signal is expected by the host adapter integrated circuit, an on-chip sequencer executes a SCSI bus phase status register read instruction. When the SCSI bus phase status register is read and has the predefined value, an active pause signal is sent to the on-chip sequencer that causes the sequencer to suspend execution of the read instruction.

When an active request signal is received from the target device, the SCSI bus phase status register is loaded automatically with a current SCSI bus phase a predefined period of time after the assertion of the request signal provided that an active parity error signal is not generated by the host adapter integrated circuit within the predefined period of time.

The loading of the SCSI bus phase status register inactivates the pause signal and so the sequencer resumes execution of the SCSI bus phase status register read instruction. Upon reading the register, the sequencer branches to a routine for the SCSI bus phase that in turn asserts an acknowledge signal if the SCSI bus phase is an expected SCSI bus phase.

Hence, this invention reduces the number of sequencer firmware instructions that must be executed prior to responding to an assertion of a request signal on the SCSI bus. Consequently, the parallel SCSI host adapter integrated circuit of this invention asserts the acknowledge signal more quickly than in the prior art host adapter integrated circuit that required execution of a complete sequence of sequencer firmware instructions prior to assertion of the acknowledge signal.

In one embodiment the parallel SCSI host adapter integrated circuit of this invention includes a memory that stores a SCSI bus phase status register read instruction. An on-chip sequencer is coupled to the memory so that the sequencer can fetch and execute the SCSI bus phase status register read instruction.

When the SCSI bus phase status register has a first value, an active signal is driven on the pause line when the SCSI bus phase status register is read by the sequencer. Upon the SCSI bus phase status register having other than the first value, an inactive signal is driven on the pause line. As used herein, all the bits in the register, a group of bits in the register, or alternatively a selected one of the bits in the registers can define the first value.

A request signal mask gate in the parallel SCSI host adapter integrated circuit of this invention includes an output terminal, and first and second input terminals. The output terminal is coupled to the SCSI bus phase status register. The first input terminal is coupled to receive a SCSI request signal. The second input terminal is coupled to a parity error line.

More specifically, a parity error sample circuit includes an input line connected to the parity error line; an enable line connected to the first input terminal of the request signal mask gate; and an output line connected to the second input terminal of the request signal mask gate. Initially, the signal on the output line to the second input terminal of the request signal mask gate is inactive. When the signal on the second input terminal of the request signal mask gate is inactive, the request signal mask gate does not pass the signal on the first input terminal therethrough.

The parity error sample circuit is enabled by the active request signal. After a predefined period of time, the parity error sample circuit samples a signal level on the parity error line, and if the signal level on the parity error line indicates no parity error, the parity error sample circuit drives an active signal on its output line to the request signal mask gate.

In response to the active signal from the parity error sample circuit, the request signal mask gate passes the active request signal therethrough to the SCSI bus phase status register. In response to the active request signal, the SCSI bus phase is loaded automatically into the SCSI bus phase status register, and the execution of the instruction reading the SCSI bus phase status register is unpaused.

The on-chip sequencer compares the SCSI bus phase in the SCSI bus phase status register and branches to a first sequencer firmware routine if the SCSI bus phase matches the expected SCSI bus phase and to a second sequencer firmware routine otherwise. In either case, only the one sequencer instruction is executed prior to the sequencer branching to another routine. Consequently, the multiple sequencer instructions executed in the prior art subroutine have been eliminated and so the host adapter integrated circuit of this invention asserts the acknowledge signal more quickly than the prior art host adapter integrated circuits.

BRIEF DESCRIPTION OF THE DRAWINGS

In the following description, elements with the same reference numeral are the same or equivalent elements.

DETAILED DESCRIPTION OF THE INVENTION

Figure 1:
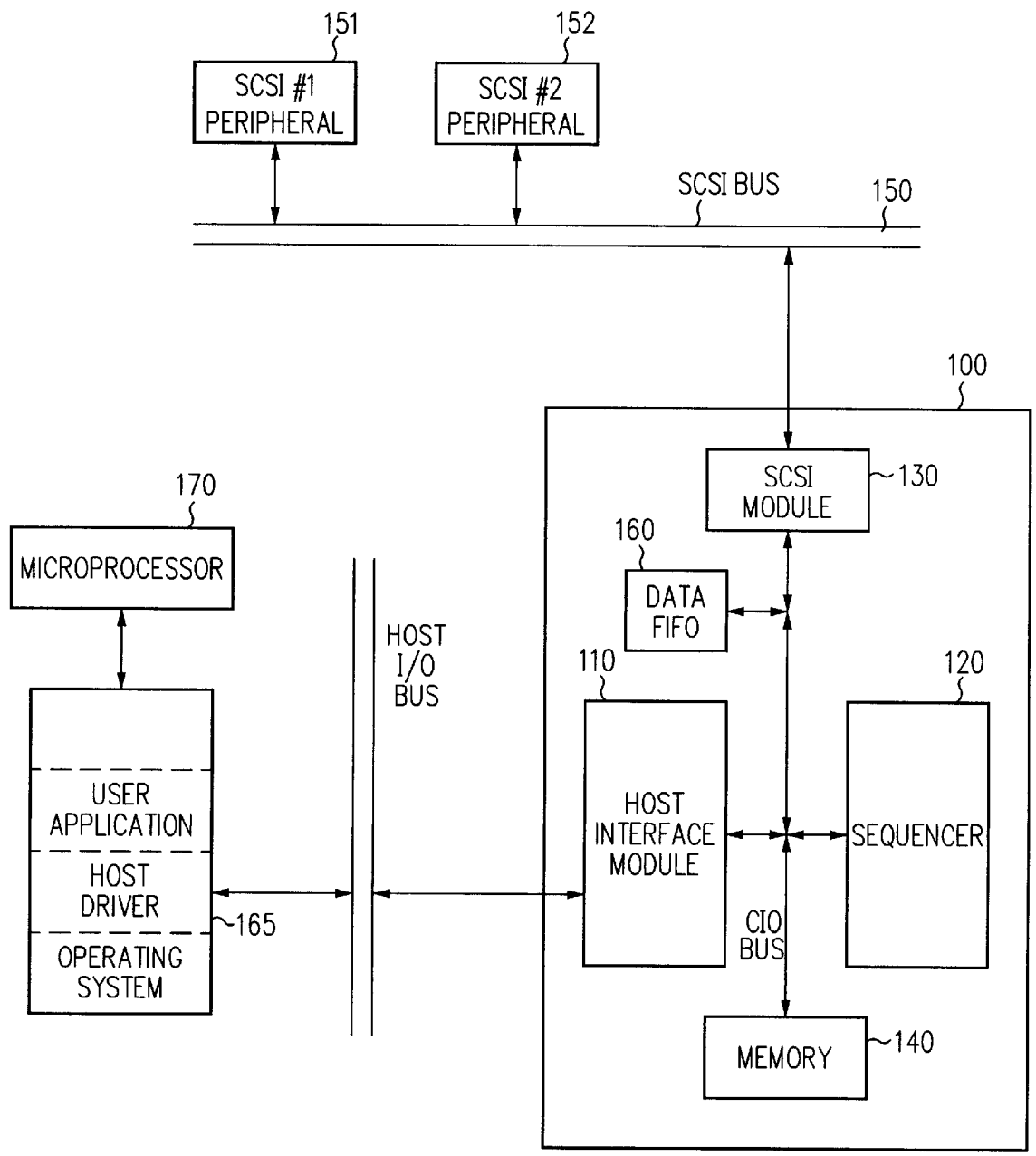
FIG. 1 is a block diagram of a prior art host adapter integrated circuit.

According to the principles of this invention, a novel SCSI bus phase status register 235 in a SCSI module 230 of a parallel SCSI host adapter integrated circuit 200 coupled with execution of a single sequencer firmware instruction 241 by an on-chip sequencer 220 reduces the number of sequencer firmware instructions that must be executed prior to responding to an assertion of a request signal REQ on a SCSI bus 250. Consequently, parallel SCSI host adapter integrated circuit 200 asserts acknowledge signal ACK more quickly than in the prior art host adapter integrated circuit that required execution of a complete sequence of sequencer firmware instructions prior to assertion of acknowledge signal ACK.

In addition to sequencer 220 and SCSI module 230, parallel SCSI host adapter integrated circuit 200 also includes a data FIFO 260, a host interface module 210, and a memory 240. Each of these elements and internal bus 280 are known to those of skill in the art, because they are similar to prior art elements, with the exceptions described herein. See for example commonly assigned U.S. Pat. No. 5,659,690, entitled "Programmably Configurable Host Adapter Integrated Circuit Including a RISC Processor," issued on Aug. 19, 1997 to Stuber et al., and commonly assigned U.S. Pat. No. 5,838,950, entitled "Method of Operation of a Host Adapter Integrated Circuit," issued on Nov. 17, 1998 to B. Arlen Young et al., each of which is incorporated herein by reference.

Figure 2A:
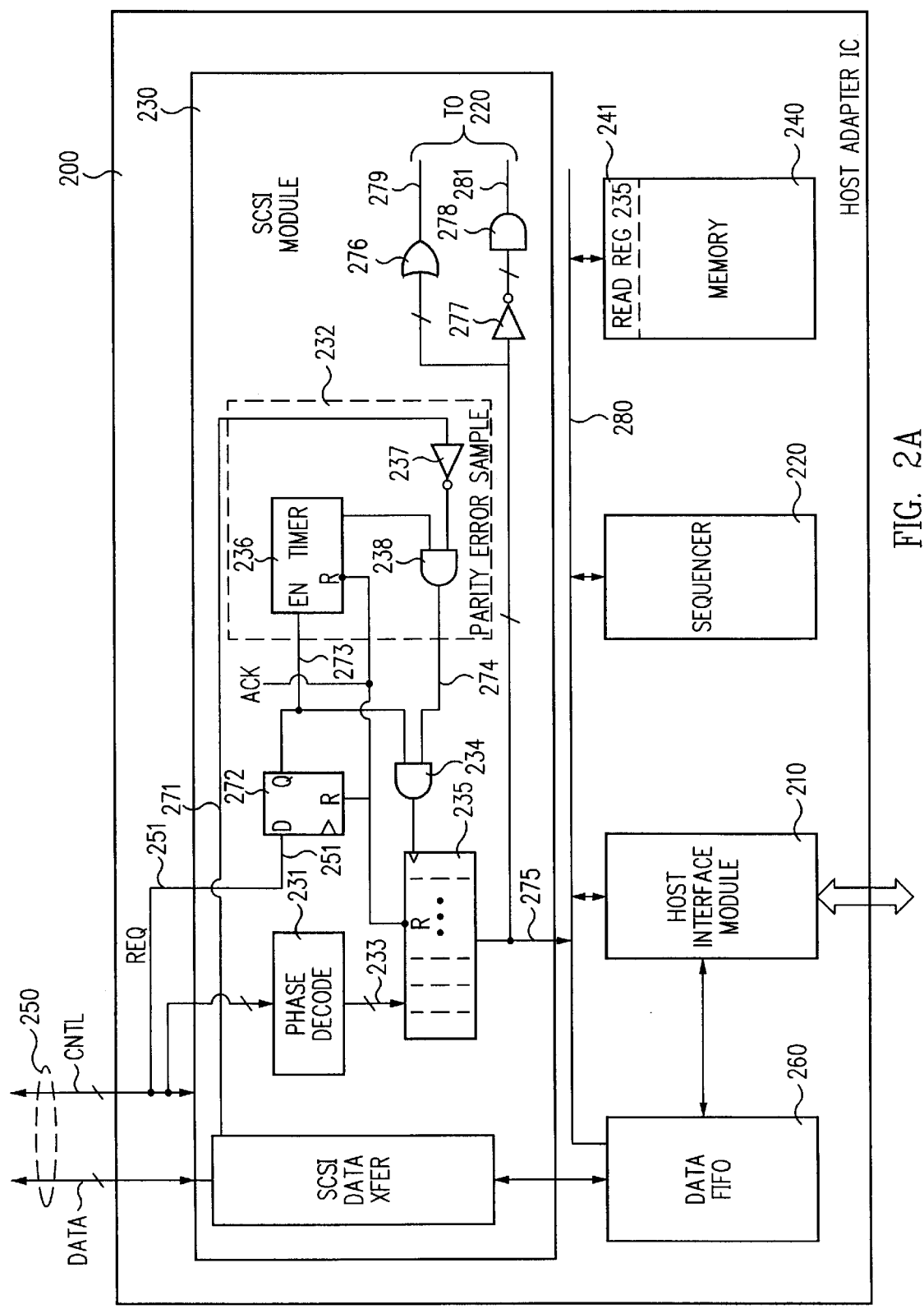
FIGS. 2A and 2B are diagrams of a parallel SCSI host adapter integrated circuit with a SCSI bus phase status register according to the principles of this invention with different implementations of the pause and unpause signals to the on-chip sequencer.
Figure 2B:
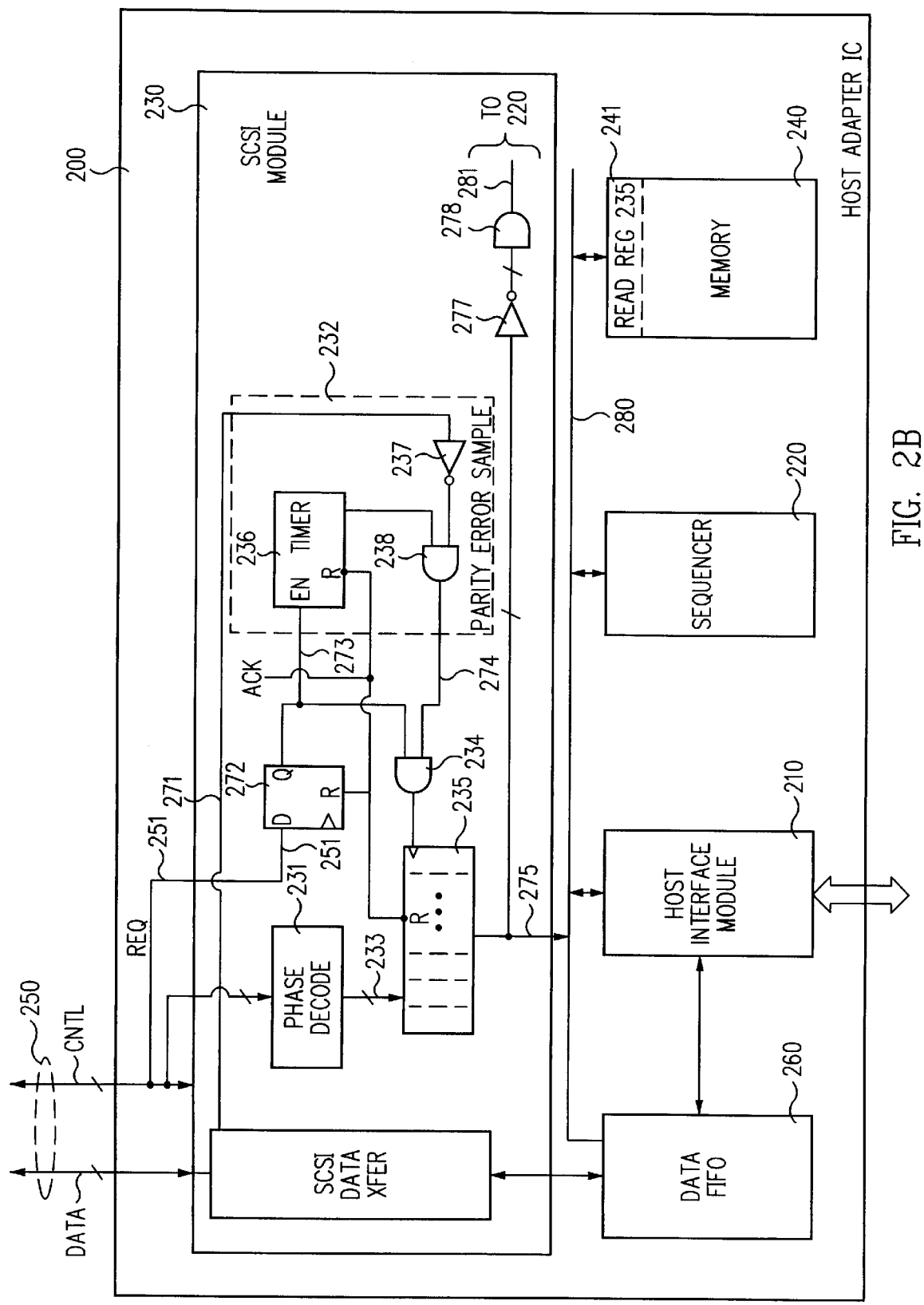

SCSI module 230 includes elements other than those illustrated in FIGS. 2A and 2B, as do the other modules. To avoid detracting from the invention, only the specific elements needed to understand the invention are shown in FIG. 2A and 2B.

SCSI bus phase status register 235 of this invention includes a plurality of bits, e.g., one bit for each SCSI bus phase of interest. Hence, each bit in register 236 is associated with a different phase on SCSI bus 250. The SCSI bus phases are well known to those of skill in the art and are not described further herein. Initially, SCSI bus phase status register 235 has a predefined value that indicates that a SCSI bus phase is not defined.

When a wait for assertion of request signal REQ is needed, sequencer 220 executes a single instruction 241 that reads SCSI bus phase status register 235 to determine the SCSI bus phase, i.e., register 235 is coupled to sequencer 220 SO that register 235 is readable by sequencer 220. If the value in SCSI bus phase status register 235 is the predefined value that indicates that a SCSI bus phase is not defined, sequencer 220 is paused. In FIGS. 2A and 2B, instruction 241 is shown stored in memory 240. This is illustrative only and is not intended to limit the invention to this storage location. In another embodiment, instruction 241 is stored in memory within sequencer 220.

Upon assertion of request signal REQ and with no parity error on SCSI bus 250, a bit in SCSI bus phase status register 235 is set automatically to indicate the current SCSI bus phase. The setting of the bit in the SCSI bus phase status register 235 unpauses sequencer 220.

Read instruction 241 that was paused resumes execution and sequencer 220 reads register 235. Read instruction 241 instructs sequencer 220 to branch to a sequencer firmware routine for the expected phase if the SCSI bus phase indicated by register 235 is the expected phase, and otherwise to another sequencer firmware routine.

Thus, a single firmware instruction 241 in combination with register 235 eliminates the multiple prior art sequencer firmware instructions that were required to perform the same operations. Since fewer sequencer firmware instructions must be executed, acknowledge signal ACK is asserted more quickly after the assertion of request signal REQ than in the prior art.

In the embodiment of FIGS. 2A and 2B, a phase decoder 231 is coupled to lines in control bus CNTL of SCSI bus 250. Phase decoder 231 has a plurality of output lines 233; each output line is connected to a different bit in SCSI bus phase status register 235. The decoding of signals on control bus CNTL of SCSI bus 250 is well known to those of skill in the art and so is not considered further. See for example, Peter M. Ridge, The Book of SCSI, A Guide for Adventurers, Chapter 6, pp. 85 to 122, No Starch Press, Daly City, Calif. (1995), which is incorporated herein by reference as an example of the knowledge of one of skill in the art.

A load terminal of SCSI bus phase status register 235 is coupled to the request line in control bus CNTL of SCSI bus 250. When request signal REQ is asserted on request line 251, the values on output lines 233 are loaded automatically into SCSI bus phase status register 235 if there is not a parity error on SCSI bus 250. Specifically, the bit in SCSI bus phase status register 235 corresponding to the phase on SCSI bus 250 is configured, e.g., is set, to indicate the SCSI bus phase.

In this embodiment, a parity error sample circuit 232 and a request signal mask gate 234 are used in conjunction with the signal level on request line 251 to prevent automatic loading of SCSI bus phase status register 235 until it is determined that there is not a parity error. An output terminal of request signal mask gate 234, which in this embodiment is an AND gate, is connected to a load terminal of SCSI bus phase status register 235. A first input terminal of request signal mask gate 234 is connected to an output terminal Q of a D-type flip-flop 272. An input terminal D of flip-flop 272 is connected to a power supply voltage. Request line 251 is connected to a clock terminal of flip-flop 272. Hence, when a request signal REQ is asserted on line 251 by a target device on SCSI bus 250, a logic one level signal is clocked on to the first input terminal of request signal mask gate 234, and is applied to an enable line 273 of parity error sample circuit 232.

A signal on a parity error input line 271 to parity error sample circuit 232 is normally at a logic low level, and is driven to a logic high level when a parity error is detected after the assertion of request signal REQ. An output line 274 of circuit 232 is connected to a second input terminal of request signal mask gate 234. Initially, a logic low level signal is generated by parity error sample circuit 232 on output line 274, and so request signal mask gate 234 does not pass the assertion of request signal therethrough to the load terminal of register 235.

A predefined period of time after the signal on enable line 273 goes active, parity error sample circuit 232 generates a logic one level signal on output line 274 to the second input terminal of request signal mask gate 234, if the signal level on parity error input line 271 remains low. In response to the high signal on line 274, gate 234 passes the active request signal to the load terminal of register 235 that in turn loads register 235 as described above.

Conversely, if the signal level on parity error input line 271 goes high indicating a parity error, parity error sample circuit 232 maintains the logic zero level signal on output line 274 to the second input terminal of request signal mask gate 234 until the parity error is cleared. Consequently, gate 234 masks the active request signal, and register 235 is not loaded automatically.

This operation of register 235 is used in conjunction with a particular instruction 241 that is executed by sequencer 220, and other features associated with register 235 that are described more completely below. When host adapter integrated circuit 200 needs to wait for assertion of a request signal REQ on SCSI bus 250, a read and branch instruction 241 is executed by sequencer 220. Specifically, this instruction reads SCSI bus phase status register 235.

When SCSI bus phase status register 235 is read by sequencer 220, a plurality of output signals from register 235 are driven onto output lines 275 that are connected to bus 280, to input terminals of OR gate 276, and to input terminals of inverters 277 in the embodiment of FIG. 2A. In the embodiment of FIG. 2B, OR gate 276 and unpause line 279 are not utilized. In this embodiment, the predefined value of register 235 is that each bit is set to a logic low level, e.g., register 235 is cleared.

Hence, when register 235 is read by sequencer 220, OR gate 276 generates a logic low level output signal on unpause line 279 that goes to sequencer 220 in the embodiment of FIG. 2A. Each of inverters 277 generates a logic high level output signal to a different input terminal of AND gate 278. Consequently, AND gate 278 generates a logic high level signal on pause line 281 that goes to sequencer 220 in FIGS. 2A and 2B. In FIG. 2B, the signal level on line 281 is used to pause and unpause sequencer 220.

In response to the logic high level signal on pause line 281, sequencer 220 suspends execution. Pausing and unpausing an on-chip sequencer is well-known to those of skill in the art see for example commonly assigned U.S. Pat. No. 5,659,690, entitled "Programmably Configurable Host Adapter Integrated Circuit Including a RISC Processor," issued on Aug. 19, 1997 to Stuber et al., and commonly assigned U.S. Pat. No. 5,838,950, entitled "Method of Operation of a Host Adapter Integrated Circuit," issued on Nov. 17, 1998 to B. Arlen Young et al., each of which is incorporated herein by reference.

Thus, when sequencer 220 executes the read and branch instruction 241, sequencer 220 is paused when register 235 has the predefined value. When the target device asserts request signal REQ, and when after the predefined period of time, SCSI module 230 indicates no parity error on parity error line 271, parity error sample circuit 232 generates an output signal to request signal mask gate 234 that in turn passes the active request signal to the load terminal of register 235.

As described above, the output signals from phase decoder 231 are loaded automatically into register 235, i.e., one bit is set, and the other bits remain cleared. Consequently, the output signal from one of inverters 277 goes to a logic low level which in turn drives the output signal of AND gate 278 low. Thus, the signal on pause line 281 is drive inactive which unpauses sequencer 220 in the embodiment of FIG. 2B. Since one output signal from register 235 is at a logic high level, OR gate 276 generates a logic high level signal on unpause line 279 in the embodiment of FIG. 2A.

In response to the unpause signal, sequencer 220 resumes execution of the read and branch instruction 241 by reading register 235. In this embodiment, sequencer 220 reads the bit in register 235 corresponding to the expected SCSI bus phase. If the bit is set, sequencer 220 branches to a routine, a first routine, that handles the expected SCSI bus phase. In execution of the first routine, acknowledge signal ACK is asserted. The active acknowledge signal resets register 235, flip-flop 272, and parity error sample circuit 232. (Those of skill in the art will appreciate that a reset signal can be used to reset register 235, flip-flop 272 and parity error sample circuit 232 when necessary.) If the bit corresponding to the expected SCSI bus phase is not set, sequencer 220 branches to a second routine that handles the condition on SCSI bus 250.

Hence, according to the principles of this invention, when host adapter 200 must wait for assertion of a request signal REQ by a target device on SCSI bus 250, sequencer 220 executes a single instruction 241 that reads SCSI bus phase status register 235. As a result of the read of register 235, sequencer 220 is paused until the target device asserts request signal REQ, and there is no parity error on SCSI bus 250. After the period of time required to detect a parity error has passed, SCSI bus phase status register 235 is loaded automatically, which in turn unpauses sequencer 220 and allows sequencer 220 to resume execution of the read of register 235. If sequencer 220 reads an expected SCSI bus phase in register 235, a first routine is executed and otherwise a second routine is executed. The combination of the one instruction and register 235 replaces many prior art sequencer instructions, and in many circumstances reduces the total number of sequencer firmware instructions that must be executed before acknowledge signal ACK is asserted.

In the embodiment illustrated in FIGS. 2A and 2B, parity error sample circuit 232 includes a timer 236 that is enabled by a logic one level signal on enable line 273. Hence, the assertion of request signal REQ on request line 251 enables timer 236. Initially, timer 236 is configured so that a logic zero is generated on the line connected to the first input terminal of an AND gate 238 in circuit 232.

After a predefined period of time, i.e., when timer 236 times out, a logic one level signal is generated on the first input terminal to AND gate 238. The predefined period of time required for timer 236 to time-out is selected so that a parity error can be detected by SCSI module 230.

As described above, if a parity error is detected, a logic one level signal is driven on parity error line 271, and otherwise a logic zero level signal remains on parity error line 271. Parity error line 271 is the input line to parity error sample circuit 232.

The signal on parity error line 271 drives an inverter 237 that in turn drives a second input terminal of AND gate 238. Hence, the output signal of AND gate 238 is a logic low level at least until timer 236 times out. After the time-out, the signal level on parity error line 271 determines the output signal level of AND gate 238.

If a parity error was detected, inverter 237 drives a low level signal on the second input terminal AND gate 238, which in turn generates a logic low level signal on output line 274. Conversely, if a parity error was not detected, inverter 237 drives a high level signal on the second input terminal of AND gate 238, which in turn generates a logic high level signal on output line 274 that in turn enables request signal mask gate 234.

The above embodiments of the invention are illustrative only of the principles of this invention are not intended to limit the invention to the particular examples presented.

I claim:

1. In a parallel SCSI host adapter integrated circuit, a structure comprising:

a sequencer;

a sequencer pause line coupled to said sequencer; and a SCSI bus phase status register, coupled to said sequencer pause line and to said sequencer, having a value representing a status of a SCSI bus phase on a SCSI bus, wherein upon said value being a first value, an active signal is driven on said sequencer pause line when said SCSI bus phase status register is read by said sequencer; and upon said value being other than said first value, an inactive signal is driven on said sequencer pause line when said SCSI bus phase status register is read by said sequencer.

2. In said parallel SCSI host adapter integrated circuit, said structure of claim 1 further comprising:

a request signal mask gate including at least:
an output terminal coupled to said SCSI bus phase status register:
a first input terminal coupled to receive a SCSI request signal; and
a second input terminal coupled a parity error line.

3. In said parallel SCSI host adapter integrated circuit, said structure of claim 2 further comprising:

a parity error sample circuit comprising:
an input line connected to said parity error line;
an enable line connected to said first input terminal of said request signal mask gate; and
an output line connected to said second input terminal of said request signal mask gate.

4. In said parallel SCSI host adapter integrated circuit, said structure of claim 1 further comprising:

a memory coupled to said sequencer; and
a SCSI bus phase status register read instruction stored in said memory.

5. In said parallel SCSI host adapter integrated circuit, the structure of claim 1 wherein said SCSI bus phase status register includes a plurality of bits and each bit in said plurality is associated with a different phase on said SCSI bus.

6. In a parallel SCSI host adapter integrated circuit, a structure comprising:

a memory;

a SCSI bus phase status register read instruction stored in said memory;

a sequencer coupled to said memory;

a sequencer pause line coupled to said sequencer;

a SCSI bus phase status register coupled to said sequencer pause line, and including a plurality of bits wherein each bit in said plurality of bits is associated with a different phase on a SCSI bus; and further wherein upon said SCSI bus phase status register having a first value, an active signal is driven on said sequencer pause line when said SCSI bus phase status register is read by said sequencer; and upon said SCSI bus phase status register having other than said first value, an inactive signal is driven on said sequencer pause line when said SCSI bus phase status register is read by said sequencer; and a request signal mask gate including at least:

an output terminal coupled to said SCSI bus phase status register:

a first input terminal coupled to receive a SCSI request signal; and a second input terminal coupled a parity error line.

7. In the parallel SCSI host adapter integrated circuit, the structure of claim 6 further comprising:

a parity error sample circuit comprising:
an input line connected to said parity error line;
an enable line connected to said first input terminal of said request signal mask gate; and
an output line connected to said second input terminal of said request signal mask gate.

8. A method for reducing a time delay between receipt of an active request signal by a parallel SCSI host adapter integrated circuit and assertion of an acknowledge signal by said parallel SCSI host adapter integrated circuit, said method comprising:

reading a SCSI bus phase status register by an on-chip sequencer when an active request signal is expected go from a target device on a SCSI bus; and pausing execution of said on-chip sequencer when said SCSI bus phase status register has a predefined value, upon said reading, wherein said predefined value represents a status of a SCSI bus phase on said SCSI bus.

9. The method of claim 8 further comprising:

unpausing execution of said on-chip sequencer upon receipt of an active request signal by said parallel SCSI host adapter integrated circuit.

10. The method of claim 9 wherein said unpausing is delayed for a predefined period of time.

11. The method of claim 10 wherein said predefined period of time is a time required to determine whether a parity error occurred on said SCSI bus.

12. A method comprising:

reading a SCSI bus phase status register with a sequencer in a parallel SCSI host adapter integrated circuit;

pausing said sequencer upon said reading when said SCSI bus phase status register has a predefined value, wherein said predefined value represents a status of a SCSI bus phase on a SCSI bus;

receiving an active request signal by said parallel SCSI host adapter integrated circuit from said SCSI bus;

loading a SCSI bus phase in said SCSI bus phase status register a period of time after receiving said active request signal if a parity error signal is not generated within said period of time; and unpausing said sequencer upon loading said SCSI bus phase in said SCSI bus phase status register so that said sequencer can resume said reading said SCSI bus phase status register.

13. A system comprising:

a SCSI bus; and a SCSI host adapter integrated circuit, connected to said SCSI bus, comprising:

a sequencer;

a sequencer pause line coupled to said sequencer; and a SCSI module comprising:

a SCSI bus phase status register, coupled to said sequencer pause line, to said SCSI bus, and to said sequencer, having a value representing a status of a SCSI bus phase on said SCSI bus, wherein upon said value being a first value, an active signal is driven on said sequencer pause line when said SCSI bus phase status register is read by said sequencer; and upon said said value being other than said first value, an inactive signal is driven on said sequencer pause line when said SCSI bus phase status register is read by said sequencer.

14. The system of claim 13 further comprising:

a memory coupled to said sequencer; and a SCSI bus phase status register read instruction stored in said memory.

\* \* \* \* \*